United States Patent [19]

Zamir

[11] Patent Number: 5,203,706
[45] Date of Patent: Apr. 20, 1993

[54] EDUCATIONAL DEVICE

[76] Inventor: Amos Zamir, 3 Hasavoraim Street, Neve Avivim, 69 207 Tel Aviv, Israel

[21] Appl. No.: 822,814

[22] Filed: Jan. 21, 1992

[51] Int. Cl.⁵ .......................... G09B 1/16; G09B 1/40
[52] U.S. Cl. ..................... 434/172; 434/171; 434/163; 434/160; 434/159; 434/87
[58] Field of Search ................ 434/87, 159, 160, 163, 434/164, 167, 171, 172

[56] References Cited

U.S. PATENT DOCUMENTS

| | | |
|---|---|---|
| 140,722 | 7/1873 | Muldaur . |
| 163,912 | 6/1875 | Birmeli .................. 434/167 |
| 569,846 | 10/1896 | Thompson .............. 434/167 |
| 1,085,405 | 1/1914 | Dadd . |
| 1,394,620 | 10/1921 | Haupt ..................... 434/167 |
| 1,396,379 | 11/1921 | Moore . |
| 1,405,063 | 1/1922 | Murray ................... 434/167 |
| 2,454,632 | 11/1948 | Cohn ................... 434/164 X |
| 2,739,815 | 3/1956 | Fay ....................... 434/167 X |
| 2,839,843 | 6/1958 | Keyko ..................... 434/167 |
| 2,900,742 | 8/1959 | Barket et al. ............ 434/171 |
| 2,922,234 | 1/1960 | Patterson ................. 434/163 |
| 3,302,310 | 3/1967 | Leven ..................... 434/171 |
| 3,391,476 | 7/1968 | Sher ..................... 434/171 X |
| 3,453,750 | 7/1969 | Rapaport ............... 434/171 X |
| 3,526,975 | 9/1970 | Reeves ................... 434/164 |
| 3,731,402 | 5/1973 | Paul . |
| 3,774,319 | 11/1973 | Sprowls .................. 434/164 |
| 3,778,910 | 12/1973 | Smalligan ................ 434/164 |
| 3,853,321 | 12/1974 | Claffie .................. 434/159 X |
| 3,903,617 | 9/1975 | Evans ..................... 434/171 |
| 4,470,197 | 9/1984 | Pagalies ................ 434/87 X |
| 4,664,633 | 5/1987 | Garda ..................... 434/164 |
| 4,690,410 | 9/1987 | Berton ................. 434/171 X |
| 5,100,324 | 3/1992 | Slayton .................. 434/87 |

FOREIGN PATENT DOCUMENTS

| | | | |
|---|---|---|---|
| 2312767 | 9/1974 | Fed. Rep. of Germany | 434/172 |
| 2709046 | 9/1977 | Fed. Rep. of Germany | 434/167 |
| 9344799 | 8/1963 | United Kingdom | 434/167 |
| 1021094 | 2/1966 | United Kingdom | 434/167 |
| 1255783 | 12/1971 | United Kingdom | 434/171 |
| 2178215 | 2/1987 | United Kingdom | 434/171 |

*Primary Examiner*—Robert P. Swiatek
*Assistant Examiner*—L. Thomas
*Attorney, Agent, or Firm*—Mark M. Friedman; Benjamin J. Barish

[57] ABSTRACT

An educational apparatus for teaching symbols, such as letters, words and numbers which includes a number of cards, each of which features a drawing and/or a word or other assembly of symbols, and a number of symbol blocks, such as letter blocks, each of which features a hollowed-out region representing a single letter, and a frame for holding one of the cards and several of letter blocks. The user can select a card, place the card on the frame, and proceed to select and place onto the frame the appropriate letter blocks to form the word represented on the card. If a sheet of paper is place below the frame, the user can proceed to stencil in the word. Furthermore, the user can fill in the letters with soft non-adhering pliable plastic putty, such as play dough or silly putty and the like, and/or to fill in the hollow letters with specially designed letter segments.

15 Claims, 6 Drawing Sheets

EDUCATIONAL DEVICE

FIELD AND BACKGROUND OF THE INVENTION

The present invention relates to an educational device or apparatus which is primarily intended to teach children the shape of symbols, such as numbers or the letters of the alphabet, and, more particularly, to a device or apparatus which enables a user to learn the shape of symbols, such as numbers or the letters of the alphabet, through a variety of visual and tactile mechanisms.

For convenience, reference is made in the ensuing descriptions primarily to letters of the alphabet. It will be readily appreciated that the following is equally applicable to symbols in general, and is not confined merely to letters. The recognition of the shape of letters forms the basis of virtually all learning. Without a full facility with the shape of the letters, one is unlikely to be able to read or write well. Many techniques have been developed for effecting the familiarization of the learner with the shapes of the alphabet. Some of these efforts are disclosed in U.S. Pat. Nos. 2,839,843, 2,454,632, 1,085,405, 3,526,975, 3,731,402, 3,778,910, 4,690,410, and 3,903,617, and in U.K. Pat. Nos. 1,225,783, 934,799, and 1,021,094. While the devices disclosed in the above publications are useful, they are also limited in scope, limiting the user to just one or a few modes of use.

It is widely acknowledged that learning, especially learning of the kind involved here, is dramatically enhanced when a variety of approaches are used to effect the learning. Thus, for example, higher efficiency is achieved whenever several of the learner's senses are actively involved. Similarly, learning efficiency increases when a task is accomplished in more than one way.

It is also well accepted that learning is enhanced when the learner finds the learning process entertaining. Thus, for example, when learning is perceived to be taking place as part of a game, the learner is more motivated to learn than when the learning appears to the learner to be by rote or under compulsion.

It would be desirable to have a learning device or apparatus which would allow a user to learn to recognize and write the shape of symbols, such as the letters of the alphabet in a manner which is highly efficient and entertaining.

SUMMARY OF THE INVENTION

According to the present invention there is provided an educational apparatus, comprising: a plurality of cards, each of the cards featuring information; a plurality of symbol blocks, each of the symbol blocks featuring a hollowed-out region representing a symbol; and a frame for holding one of the cards and a plurality of the symbol blocks.

According to further features in preferred embodiments of the invention described below, the cards feature a drawing and/or a word and can be conveniently placed onto the frame.

According to still further features in the described preferred embodiments each of the symbol blocks can be attached to the frame and to an adjoining symbol block.

According to another embodiment a sheet of paper may be placed under the frame so as to allow the user to stencil out the letter to form a word. The sheet of paper may be secured to the frame, while the frame may itself be immobilized, for example, to a table, through use of, for example, suction cups.

According to another embodiment letter segments are provided which can be inserted into the hollowed-out regions of the letter blocks.

The present invention successfully addresses the shortcomings of the presently known configurations by providing a device or apparatus which gives the user the chance to learn the shapes of symbols, such as the letters of the alphabet through the use of a large variety of activities which serve to reinforce the learning.

The present invention discloses a novel educational tool which includes a frame which can accommodate a card and a number of letter blocks. Each card may feature a drawing or picture and/or a word which describes or relates to the drawing or picture, if any. A card is placed onto the frame. The user then selects the appropriate letter blocks and connects the blocks, in the correct sequence, to the frame.

Once the word has been assembled, the user can use a pencil or other writing utensil to recreate the word on paper placed below the frame by tracing the letter through the hollowed-out regions in each letter block which represents a letter.

The user may, in addition or alternatively, use soft non-adhering pliable plastic putty, such as play dough or silly putty, or similar materials to fill in the hollowed-out regions of the letter blocks to recreate the letters in this alternative matter. Once the filling material has been inserted, it can be removed by pressing out from the opposite side to produce complete letters made out of the filling material.

The user may also use letter segments made of rigid material, to fill in the hollowed-out regions of the letter blocks, thereby carrying out one more activity related to the learning of the shapes of the letters.

The device according to the present invention can be used independently by the learner, or under supervision of a parent or teacher. Furthermore, the device can be used by itself or it can be incorporated into a large number of games which may have as one of their goals the teaching the shape, size, and order of a each member of a set of symbols, such as an alphabet.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an educational device or apparatus which can be used to accelerate the learning of the shapes of the letters of the alphabet, as well as word spelling and the order of the alphabet. Specifically, the present invention can be used to teach one who is learning the letters of the alphabet to recognize and to form the correct shape of each letter through a variety of interesting and entertaining activities, all of which are designed to impress upon the mind of the user the shapes of the various letters.

The operation and principles of an apparatus according to the present invention can be better understood with reference to the drawings which illustrate several exemplary devices and which are not intended to limit the scope of the present invention to the configurations and embodiment shown.

Figures 1, 2, 3:
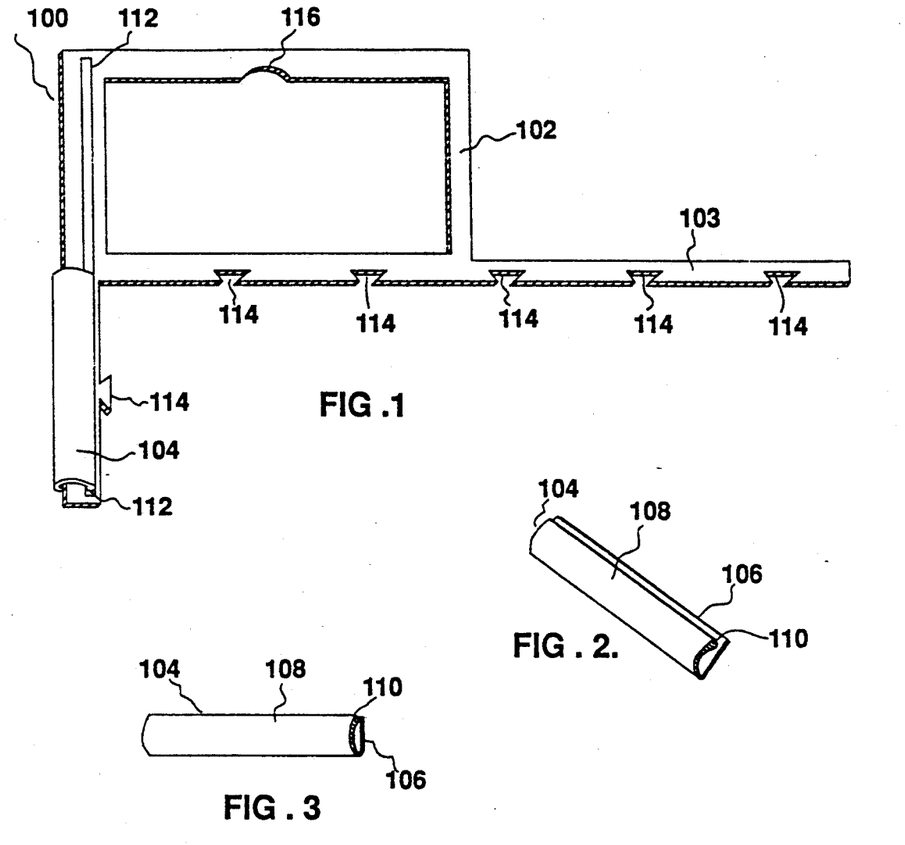
FIG. 1 shows an example of a frame according to the present invention.
FIG. 2 is a perspective view of a paper fastener shown in FIG. 1.
FIG. 3 is another perspective view of a paper fastener shown in FIG. 1.
Figure 6:
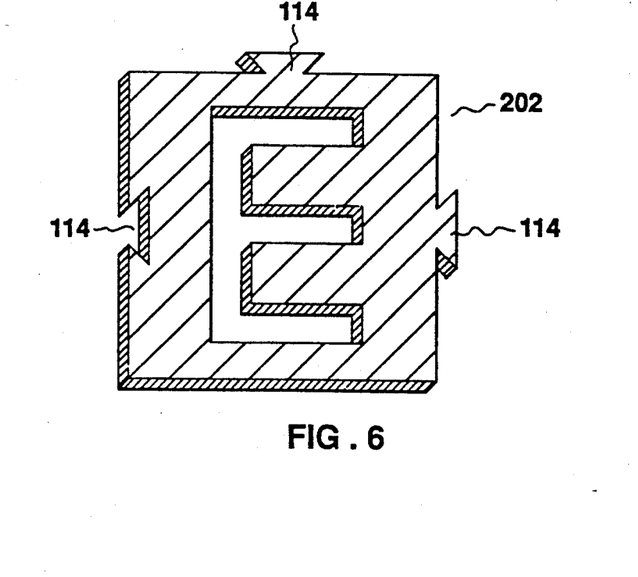
FIG. 6 shows a typical letter block.
Figure 7:
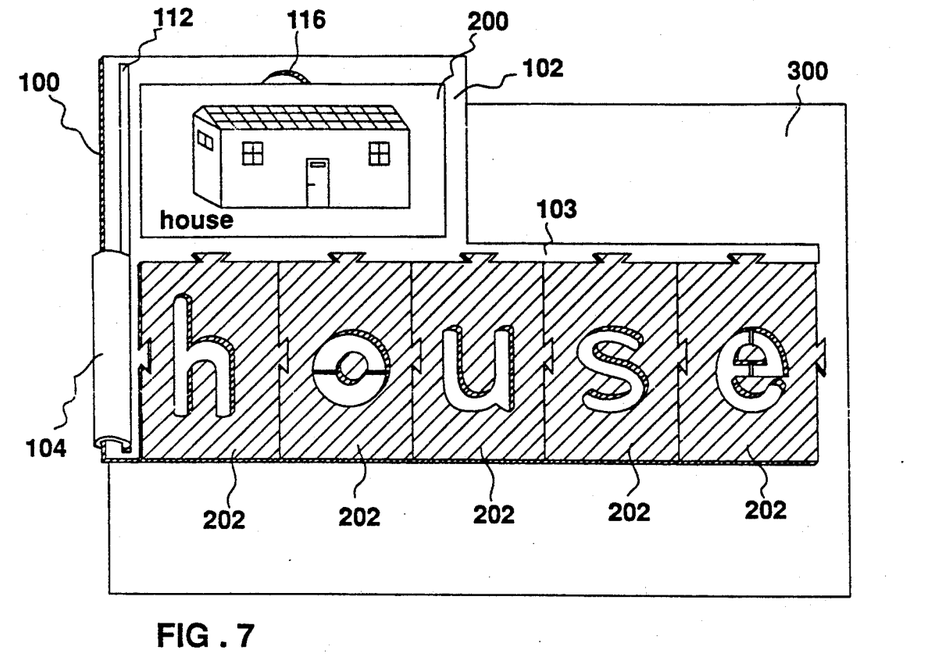
FIG. 7 shows a frame of FIG. 1 with a card of FIG. 4 and with a number of letter blocks as in FIG. 6 connected to the frame, which form the word describing the picture in FIG. 4.

Referring now to the drawings, FIG. 1 illustrates one of the components of an apparatus accoutering to the present invention, namely a frame, designated generally as 100. Frame 100 can be made of any suitable rigid or semi-rigid material, including, but not limited to paperboard, plastic, wood or metal, and can have any suitable shape, providing it includes a card receptacle 102 which is capable of receiving a card 200 (FIG. 4) and further includes a letter block receiver 103 capable of receiving a plurality of letter blocks 202 (FIG. 6). Letter blocks 202 are used for illustrative purposes only. Any other symbols, for example, numbers, may be used in lieu of, or in addition letters. For the sake of simplicity, in what follows discussion is largely restricted to letters, it being understood that the scope of the present invention is not limited to the use of letters but rather encompasses any symbols.

In one embodiment, frame 100 also includes means for attaching a sheet of paper 300 (FIGS. 5, 7, 9 and 10), such as a fastener or a clip 104. Clip 104 may be of any convenient design provided that it is capable of detachably attaching paper 300 and holding paper 300 and frame 100 reasonably fixed relative to each other.

One type of clip 104 is shown in two different views in FIGS. 2 and 3. Illustrative clip 104 consists of single piece of material, preferably plastic, which features a flat lower member 106 and a rounded upper member 108. Lower member 106 and upper member 108 are preferably made from one integral piece of plastic and are connected to each other along one edge and approach each other along the opposing edge to form a slitted opening. The edge of upper surface 108 facing the slitted opening features a linear protrusion 110 which is of a size and shape so as to fit into a slot 112 in frame 100.

It is preferable to detachably attach paper 300 to frame 100 so as to immobilize paper 300 relative to frame 100 and thereby facilitate the use of letter blocks 202 as stencils. Any convenient method of attaching paper 300 to frame 100 may be used. An example of one such technique is illustrated in the figures.

To attach a sheet of paper 300 to frame 100, all that is necessary is to slide clip 104 upwards along slot 112 sufficiently to allow a sheet of paper 300 to be placed below the area of frame 100 where letter blocks 202 are to be placed. Once paper 300 has been placed in the appropriate location beneath frame 100, the user slides clip 104 downward along slot 112, so as to cause paper 300 to be trapped between clip lower member 106 and the bottom surface of frame 100, as shown in FIGS. 5, 7, 9 and 10. Clip lower member 106 should be thin so as to allow frame 100 to lie as flat as possible during use.

Alternatively, and preferably, that portion of the bottom surface of frame 100 in contact with clip lower member 106 should be shaped so that the overall thickness of frame 100, clip lower member 106 and paper 300 does not exceed the full width of frame 100, thereby making it possible for the entire frame 100 to lie flat on the supporting surface, such as a table, on which frame 100 rests.

Figure 11:
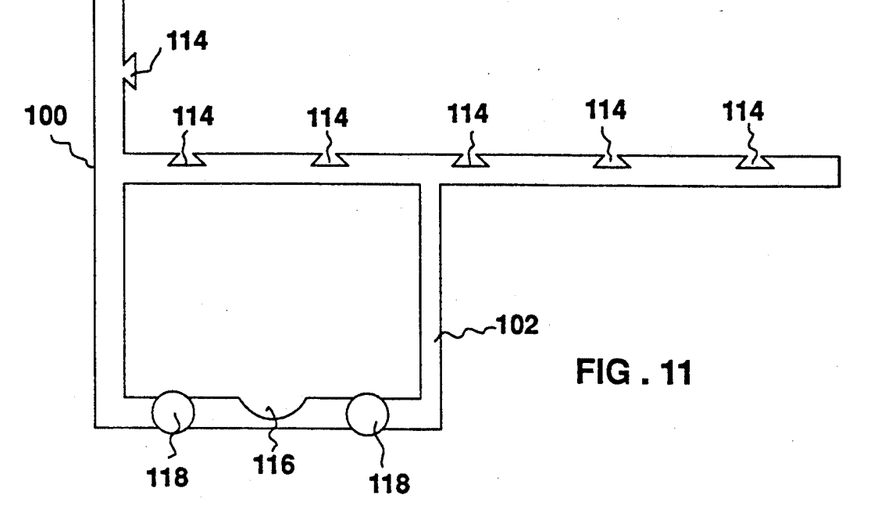
FIG. 11 shows the back side of the frame of FIG. 1 showing the suction cups which serve to immobilize the frame during use.
Figure 12:
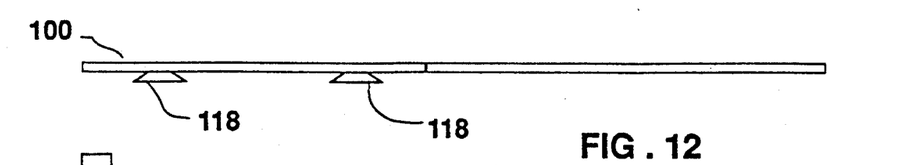
FIG. 12 is a side view of FIG. 11.

In another embodiment of an apparatus according to the present invention, frame 100 features means for immobilizing frame 100 by attaching it to the surface on which it is placed during use, typically a table. Such attachment means may be of any convenient type, preferably the bottom surface of frame 100 features one or more suction cups 118 (FIGS. 11 and 12) capable of attaching to the underlying surface when pressed toward such a surface.

Frame 100 also includes letter block receiver 103 for accommodating letter blocks 202 (as in FIG. 6). Any convenient means 103 of receiving letter blocks 202 may be used. Depicted in FIGS. 1, 5, 7, 9, 10 and 11 are a series of dovetail members 114, which may be either male or female or both, and which are properly spaced and sized so as to be able to accommodate the various letter blocks 202.

Figure 4:
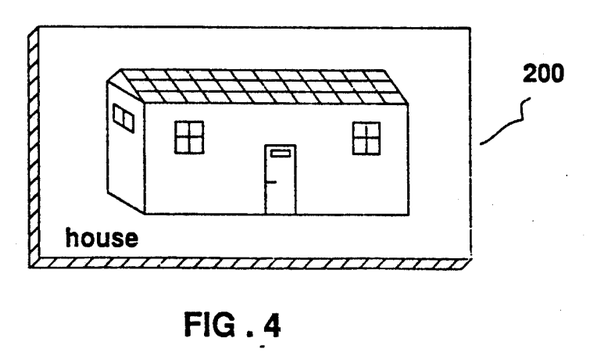
FIG. 4 shows a typical card.
Figure 5:
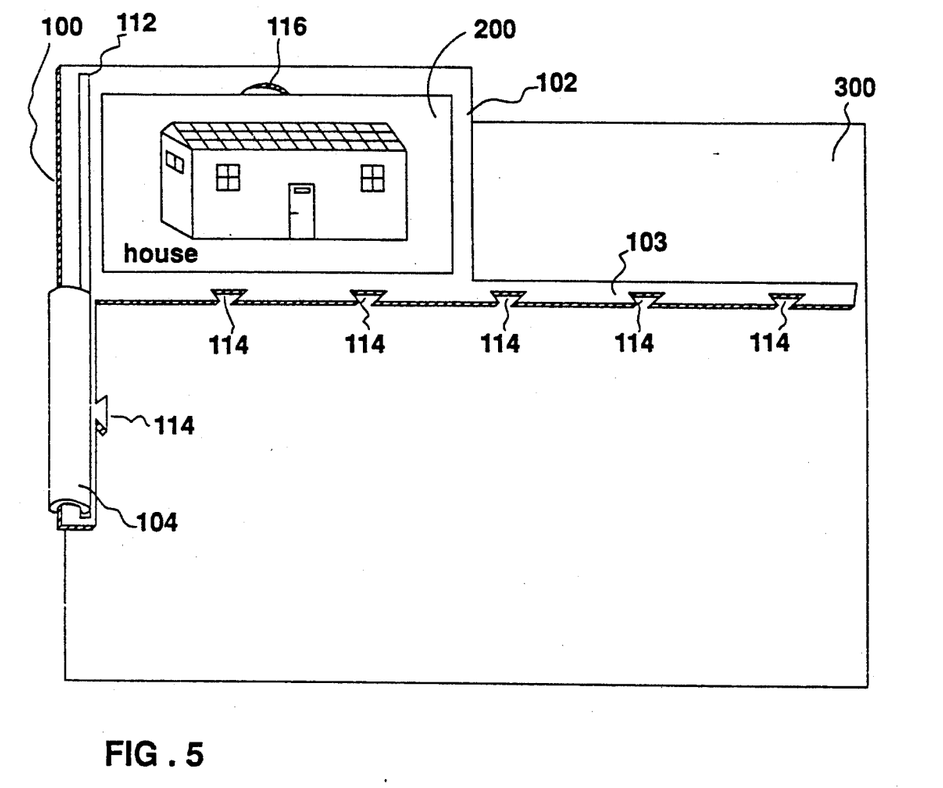
FIG. 5 shows the frame of FIG. 1 with the card of FIG. 4 mounted thereto.

Another component of an apparatus according to the present invention is a plurality of cards 200 such as the one shown in FIG. 4. Card 200 can be made of any suitable rigid or semi-rigid material, including, but not limited to, paperboard, plastic, wood or metal. Each of card 200 features information which may be a drawing, a picture, a word, symbols, or any combination of these or other elements. FIG. 4 shows card 200 featuring a drawing of a house and the word 'house' written in lower case letters. Lower case letters are used for illustrative purposes only. It is, of course, also possible to use any other symbols, including, but not limited to, capital letters, as well as numbers and mathematical operators. Cards 200 are sized so as to easily be accommodated by card receptacle 102. To aid in the removal of cards 200 from card receptacle 102, card receptacle 102 may be provided with a finger indentation 116 which makes it possible for the user to slip one of his fingers into finger indentation 116 and with an upward movement of his finger to release card 200 from card receptacle 102. FIG. 5 depicts frame 100 with card 200 inserted in card receptacle 102. A typical card 200 will, for example, include a picture and next to the picture, a word describing the picture. The user will be able to recognize and write the word.

Each of cards 200, depicting an object, an animal, a scene, etc., may be prepared by the manufacturer of the apparatus. In addition, or alternatively, the user may prepare his own cards 200 to fit his own particular needs, for example, by incorporating a picture or drawing of the user into card 200. Such user-prepared cards may be made by the user using his own resources, or the manufacturer may provide a number of blank cards of appropriate size and shape onto which the user could draw or attach his own pictures, drawings, words, etc. Use of user-created images makes the learning process somewhat more individualistic and personalized and helps further motivate the user.

Another component of an apparatus accoutering to the present invention is a plurality of letter blocks 202. One such letter block 202 is shown in FIG. 6. Letter block 202 is rectangular in shape and features a number of dovetail members 114 which make it possible to attach adjoining letter blocks to each other and to frame 100. The attachment of adjoining letters immobilizes the letters relative to each other and lends permanence and unity to the word being created by the user. Any other suitable means of attachment may be used to attach adjoining letter blocks 202 to each other and to frame 100. Letter block 202 shown in FIG. 6 features dovetail members 114 at the top and at its right and left sides. In an alternative embodiment (not shown) letter blocks 202 may, in addition, feature a dovetail member 114 at the bottom, which will enable letter blocks 202 to be attached to each other vertically.

Letter blocks 202 are preferably of a thickness which slightly exceeds the thickness of frame 100. This facilitates the removal of letter blocks 202 from frame 100.

It is preferably to include on letter block 202 an indication of the right/left and/or up/down orientation of letter block 202. This is useful in guiding the user to properly orient letter block 202 onto frame 100. Such a indication may take any One of a large number of forms. For example, the top right portion of each letter block 202 may bear a certain identifying mark, or letter blocks 202 may be otherwise color-coded to indicate the proper orientation.

Rather than the letter being imprinted on letter block 202, each letter is formed by the inner boundaries of a hollowed-out region in each letter block 202. The hollowed-out regions extend all the way from the front surface of letter block 202 to its back surface, which makes it possible to use letter blocks 202 as stencils for the writing of the various letters.

In using a device according to the present invention one would attach a sheet of paper 300 to frame 100 using clip 104. It is important to note that many types of paper could be used, including, preferably, a blank sheet of ordinary writing paper of standard size. One would then place card 200 in card receptacle 102 (See FIG. 5) and proceed to attempt to place the proper letters in proper sequence onto frame 100 so as to correctly spell the word or words depicted in the information on the face of card 200.

Once the appropriate letter blocks 202 have been placed onto frame 100 (See FIG. 7), the user can proceed with a number of activities which tend to reinforce the learning of the shape of the letters. Such activities can take the form of 'filling in' the hollowed-out letters.

Figure 9:
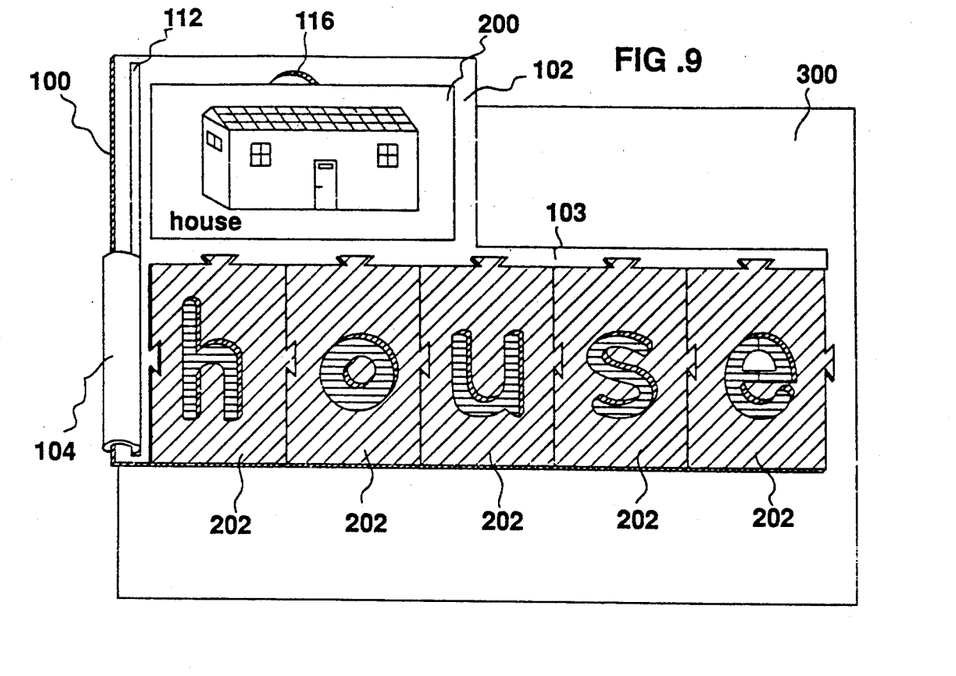
FIG. 9 is a depiction of the device as in FIG. 7 but where the user has used the letter blocks as stencils and has filled in the hollowed-out spaces of each letter with pencil marks.
Figure 10:
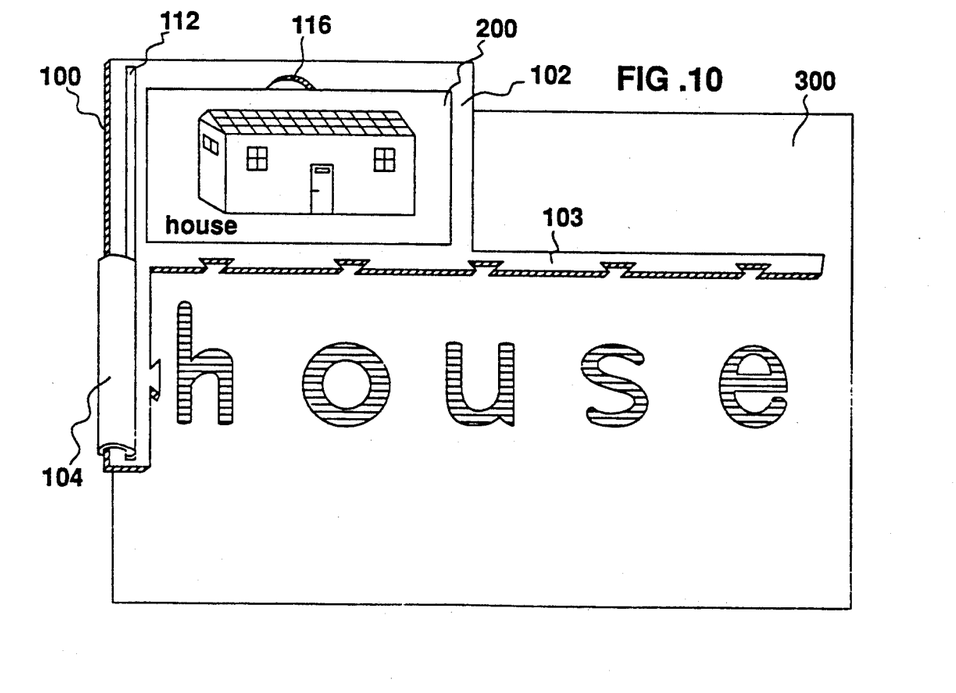
FIG. 10 is a depiction of FIG. 9 after the letter blocks have been removed to expose the paper bearing the stencil marks.

One way in which this can be done is by using a pencil, a crayon, or another writing implement to recreate the shape of the letters onto paper 300 by using letter blocks 202 as stencils. FIG. 9 shows the apparatus as in FIG. 7 with the letters 'filled in' so as to recreate the letters on paper 300. At this point the user may wish to remove letter blocks 202 from frame 100 fully exposing paper 300 on which the letters and words have been recreated as is shown in FIG. 10.

Figures 17, 18, 19:
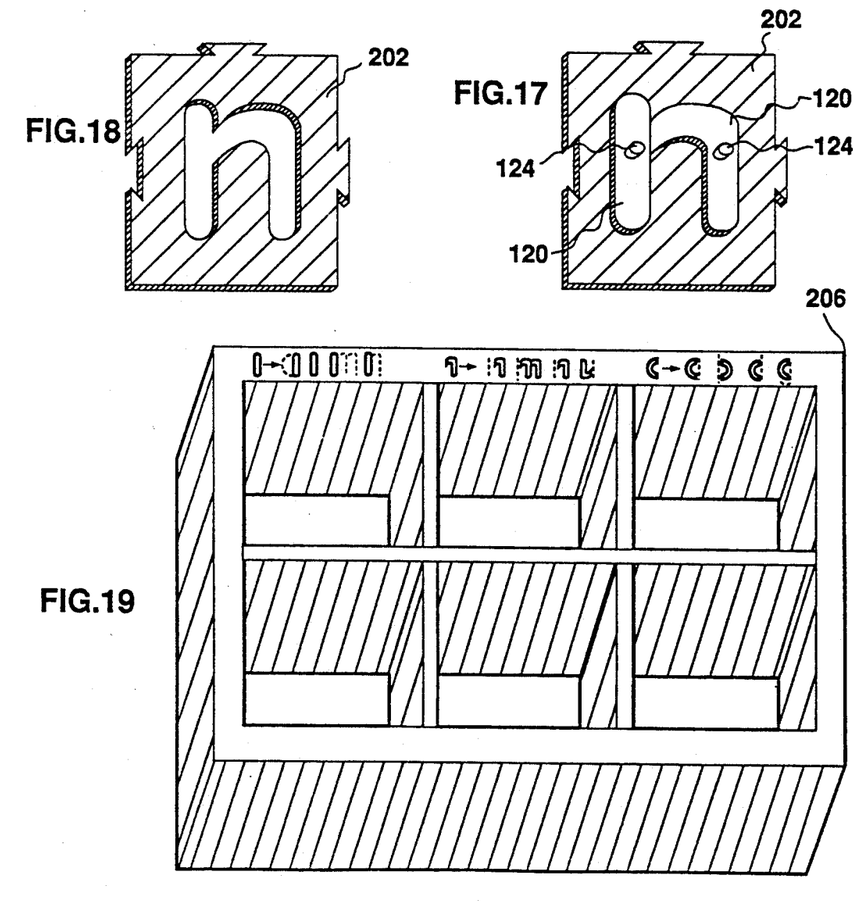
FIG. 17 is a letter block into which have been inserted the letter segments shown in FIGS. 15 and 16.
FIG. 18 is a letter block which features an arrow indicating the direction in which the user should draw the letter.
FIG. 19 is a partitioned container which serves to house the letter segments, such as those of FIG. 14-16.

In an alternative embodiment of an apparatus according to the present invention, letter blocks 202 feature markings which indicate to the user the proper way of writing the letter. Such markings may take on the form of a series of numbers and/or arrows showing the user where to start each phase of the letter and in which direction to direct the writing implement. One simple example of this is shown in FIG. 18.

Figure 8:
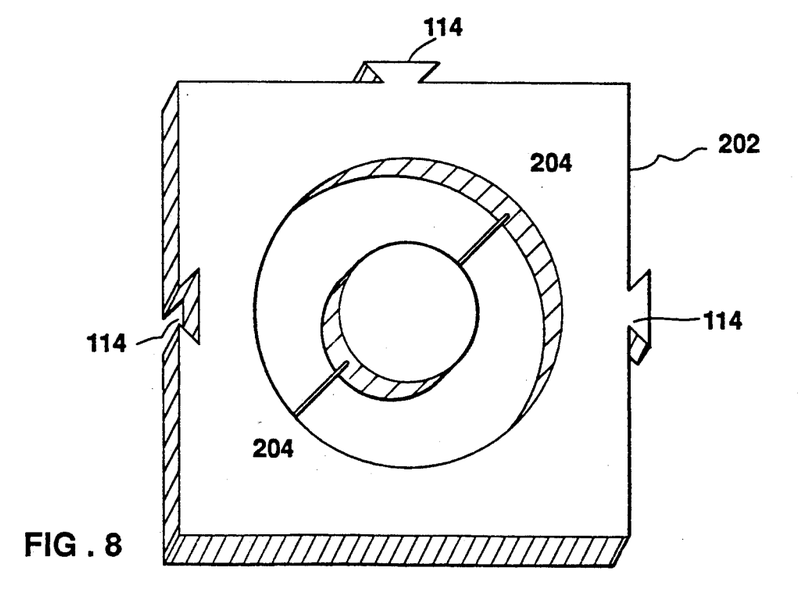
FIG. 8 is a letter block for the letter 'O' showing a method of attaching the inner portion of the letter to the block.

Certain letters, such as 'e' and 'o' are somewhat problematic in that when formed negatively through the absence or removal of material from a block, as in the context of letter blocks 202, regions are left which are isolated from the blocks. These 'islands' must be somehow connected to the block in order to maintain their desired location. Several ways of accomplishing this are possible. One way involves distorting the letter somewhat so as to leave a solid connection between the island and the block. For example, the letter 'o' can be formed by two facing near-semicircular hollowed-out regions. To facilitate the filling in of the letters using a pencil or a crayon, it is preferable to construct those letter blocks 202 so that the islands are connected to the block through one or more fine connectors 204. Connectors 204 are preferably fine rods, typically of metal or plastic, with a diameter much smaller than the thickness of letter blocks 202. Connectors 204 are placed at a point intermediate between the front and back surfaces of letter block 202, preferably near, but not at, the lower surface. Such placement makes it possible for the user to paint, using a pencil or crayon, the portions of paper 300 immediately below connectors 204.

Another way of 'filling in' the letters involves use of soft non-adhering pliable plastic putty, such as play dough or silly putty, or similar materials to fill in the hollowed-out regions of the letter blocks to recreate the letters in this alternative matter. Once the filling material has been inserted, it can be removed by pressing out from the opposite side to produce complete letters made out of the filling material.

The use of connectors 204 properly located as described above, ensures that the top surface of each symbol is continuous and uninterrupted. One consequence of the use of properly placed connectors 204 is that the user is able to feel the precise and complete shape of the letter, for example, by closing his eyes and passing his fingers over the hollowed-out regions of letter blocks 202. A further consequence of the use of properly placed connectors 204 is that when pliable material is pressed out of letter block 202 it forms a single complete symbol with a smooth and continuous upper surface.

Figure 14:
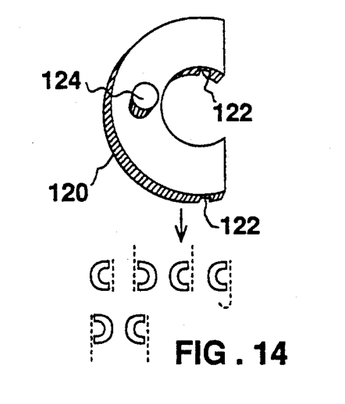
FIG. 14 shows an example of a letter segment which may be used to form letters such as 'a', 'b', 'c', 'g', 'p', 'd' and 'q'.
Figure 15:
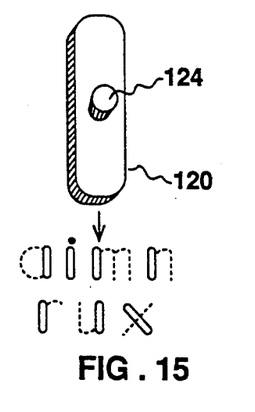
FIG. 15 is an example of a letter segment which may be used to form letters such as 'a', 'm', 'n', 'r', 'u', 'i' and 'x'.
Figure 16:
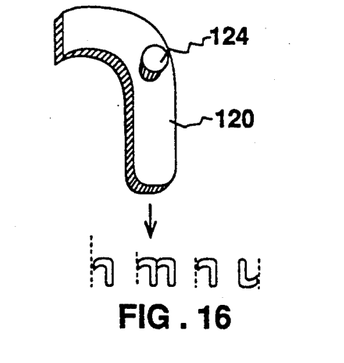
FIG. 16 is an example of a letter segment which may be used to form letters such as 'h', 'm', 'n', and 'u'.

Yet another way of 'filling in' the letters involves use of letter segments 120 (as in FIGS. 14–16). Letter segments 120 can be made of any convenient material, preferably of plastic, and can come in a number of shapes such that any letter can be formed through the use of one or more appropriately selected segments. For example, the letter 'c' may be formed from the single segment shown in FIG. 14, while the letter 'n' can be formed from the segments shown in FIGS. 15 and 16, as is shown in FIG. 17. Those letter segments 120 which can be used to form letters featuring 'islands', such as 'a', 'o', 'p', etc., are provided with appropriately placed and sized grooves 122 (as in FIG. 14 at their lower surface so as to enable segments 120 to easily accommodate connectors 204. The placement of connectors 204 near the bottom surface of letter blocks 202 reduces the height of grooves 122 and renders letter segments 120 structurally stronger.

Letter segments 12 preferably feature handles 124 attached to their upper surfaces which make it easier for the user to grasp each segment 120 and insert it into, or remove it from, letter block 202.

When not in use, letter segments 120 may be stored in a compartmentalized container 206 (FIG. 19) which can accommodate the various letter segments by type so as to facilitate the retrieval of the proper segments by the user. Compartmentalized container 206 preferably features notations or indications near each compartment indicating to the user which letters can be formed using the segments 120 stored in that compartment.

In another embodiment of an apparatus according to the present invention, the apparatus includes a letter board 208 (see FIG. 13) which serves to store letter blocks 202 when not attached to frame 100 and which serves to present the letter to the user in an organized fashion. Typically, the letters are presented to the user on letter board 208 in alphabetical order, which helps the user learn the order of the letters. To accommodate words having repeat letters, it will ordinarily be necessary to provide for more than one copy of many letters. Such additional letters could be accommodated, for example, through additional locations on letter board 208 at the end of the alphabet, or immediately following the corresponding initial letter.

Figure 13:
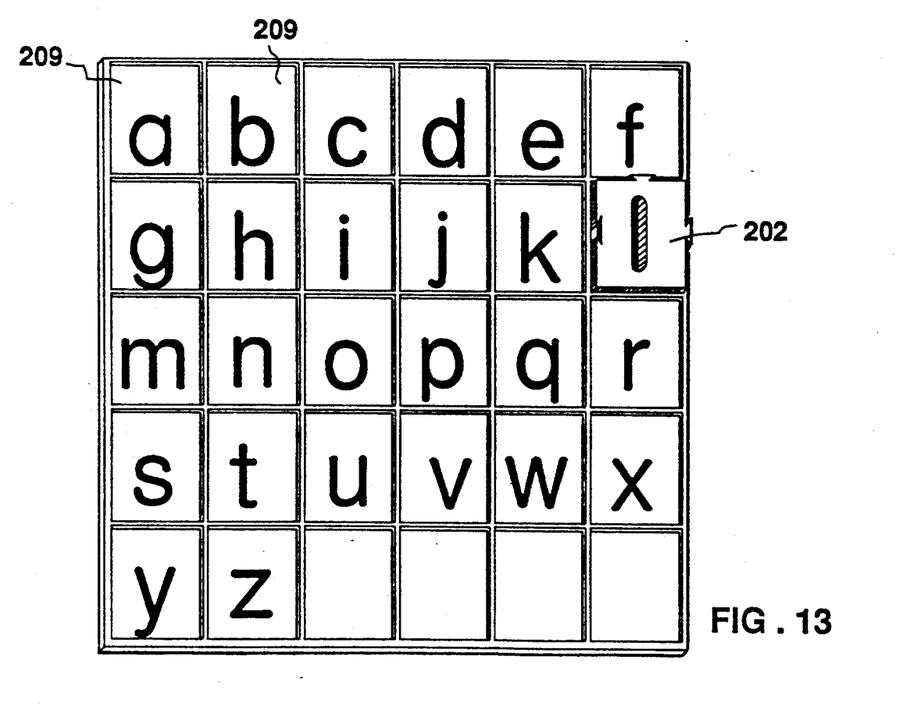
FIG. 13 shows a partitioned container which serves to hold the letter blocks when they are not in use.

Letter board 208 preferably includes a number of compartments, each of which easily accommodates letter block 202 corresponding to single letter. The upward-facing surface of each compartment preferably has printed on the letter which corresponds to it. The printed letter is such a size and shape that, when the corresponding letter block 202 is in place on letter board 208, the printed letter can be seen through the hollowed-out regions of letter block 202. Also, when the letter block 202 has been removed from frame 100 and it is desired to restore letter block 202 to its place on letter board 208, the user can easily locate the compartment of the letter block to be replaced. Each compartment preferably features raised boundaries which serve to immobilize stored letter block 202 and prevent letter block 202 from unintentionally sliding out of its place o letter board 208. The raised boundaries should be sufficiently tall to immobilize letter block 202 but sufficiently short to facilitate the easy removal of letter block 202 by the user.

Letter board, in addition to a large printed letter, preferably also features a depiction of the letter 209 as it would be made up of letter segments 120. Depiction 209 is helpful for the user trying to fill in the letters with letter segments 120.

While the invention has been described with respect to one preferred embodiment, it will be appreciated that many variations, modifications and other applications of the invention may be made.

What is claimed is:

1. An educational apparatus, comprising:
   (a) a plurality of cards, each of said cards featuring information;
   (b) a plurality of symbol blocks, each of said symbol blocks featuring a hollowed-out region representing a symbol;
   (c) a frame for holding one of said cards and a plurality of said symbol blocks; and
   (d) a plurality of symbol segments capable of being inserted into said hollowed-out regions in said symbol blocks.

2. An apparatus as in claim 1 wherein said information featured by each of said cards includes a drawing.

3. An apparatus as in claim 1 wherein said information featured by each of said cards includes a word.

4. An apparatus as in claim 1 wherein said symbol includes a letter.

5. An apparatus as in claim 1 wherein said symbol includes a number.

6. An apparatus as in claim 1 wherein each of said symbol blocks includes means for attaching said symbol block to an adjoining symbol block.

7. An apparatus as in claim 1 wherein each of said symbol blocks includes means for attaching said symbol block to said frame.

8. An apparatus as in claim 1 wherein said frame includes means for holding a sheet of paper.

9. An apparatus as in claim 1 wherein said frame includes means for immobilizing said frame.

10. An apparatus as in claim 9 wherein said means for immobilizing said frame includes a suction cup.

11. An apparatus as in claim 1 wherein said symbol segments feature upward projection members which can be grasped to facilitate the placement of said symbol segments into said hollowed-out regions and their removal therefrom.

12. An apparatus as in claim 1 wherein said symbol blocks further include connectors for attaching otherwise isolated portions of said symbols and wherein said symbol segments include a groove on their lower surface to accommodate said connectors.

13. An apparatus as in claim 1 further comprising a symbol board onto which said symbol blocks can be placed when not being held by said frame.

14. An apparatus as in claim 13 wherein said symbol board includes compartments for accommodating each of said symbol blocks, each of said compartments featuring a depiction of said symbol which is visible through said hollowed-out regions.

15. An apparatus as in claim 1 further comprising a partitioned container for storing said symbol segments when said symbol segments are not inserted into said hollowed-out regions in said symbol blocks.

* * * * *